United States Patent [19] [11] 3,961,979
Abercrombie, Jr. [45] June 8, 1976

[54] METHOD FOR CONTROLLING THE VISCOSITY OF DISPERSED CLAY SLURRIES

[75] Inventor: William F. Abercrombie, Jr., Macon, Ga.

[73] Assignee: J. M. Huber Corporation, Locust, N.J.

[22] Filed: June 17, 1974

[21] Appl. No.: 479,714

[52] U.S. Cl. .............................. 106/308 N; 106/72; 106/288 Q
[51] Int. Cl.² ........................................... C09C 1/42
[58] Field of Search .............. 106/308 Q, 308 N, 72, 106/288 B

[56] References Cited
UNITED STATES PATENTS
2,982,665 5/1961 Wilcox ................................. 106/72

Primary Examiner—Winston A. Douglas
Assistant Examiner—J. V. Howard
Attorney, Agent, or Firm—Harold H. Flanders; John R. Kirk, Jr.

[57] ABSTRACT

A method for controlling the viscosity of dispersed clay slurries is disclosed. In accordance with the invention the problem associated with shipping or storing clay slurries in tank cars or tanks, that is, significant increases in the viscosity of the slurry which often results in the formation of a gelled mass, is overcome by the addition of the pentasodium salt of diethylenetriamine pentacetic acid (DTPA). The addition of the diethylenetriamine pentacetic acid salt serves to control the viscosity of the clay slurry in a manner such that it remains at a substantially uniform and low level even when the slurry is shipped or stored over extended periods of time. The diethylenetriamine pentacetic acid pentasodium salt is added to the slurry in relatively small quantities, i.e., up to 5.0 pounds/ton clay and unexpectedly does not affect the properties or characteristics of the clay pigment or product.

5 Claims, No Drawings

METHOD FOR CONTROLLING THE VISCOSITY OF DISPERSED CLAY SLURRIES

BACKGROUND OF THE INVENTION

1. Field of the Invention

The present invention relates to clays and, more particularly, to a unique technique for controlling the viscosity and preventing gelling of clay slurries stored or shipped in tanks, tanks cars, and the like.

2. Description of the Prior Art

As known in the art, refined clays are sold under certain required specifications including, e.g., brightness, particle-size distribution, viscosity, and the like. Because natural variations in the properties of crude clay are common, the crude clay ore is subjected to various known processing techniques, such as fractionation, delamination, treatment with chemical additives, leaching agents, flocculants, etc. A specific example of such a process is disclosed in U.S. Pat. No. 3,371,988 to Maynard et al which issued Mar. 5, 1968. In accordance with the innovation disclosed by this patent, an aqueous clay suspension is contacted with a peptizing agent in an amount in excess of that required to maintain minimum viscosity and in an amount sufficient to effect separation of titanium impurities and to improve the brightness of the clay. Further examples of known processes for refining or treating clays are disclosed in U.S. Pat. Nos. 3,320,027 and 3,442,677.

Notwithstanding the precise process employed, e.g., the use of specific leaching agents, etc., it is common practice in the industry to ship the refined clay pigments to the ultimate user or customer as a dispersed high solids slurry thereof.

SUMMARY OF THE INVENTION

In summary, the present invention relates to the unique technique or process for controlling the viscosity of clay slurries shipped or stored in tank cars, tanks, etc. In this regard and at the very outset, it should be noted that the process of the invention, and its objects, are to be distinguished from prior art proposals for stabilizing slurries containing various inorganic pigments to prevent the settling of the pigment from the slurry and to form, at the bottom of the tank or tank car, a thick cake. An example of a solution to this problem is disclosed in U.S. Pat. No. 3,790,394, which issued Feb. 5, 1974. Also, the proposal of the present invention should be distinguished from known techniques which involve reducing the viscosity of clay slurries or slips employed for coating paper and the like. An example of such a prior art proposal is disclosed in U.S. Pat. No. 3,303,035, which issued Feb. 7, 1967. Prior art proposals for stabilizing the viscosity of clay slurries or slips are disclosed in U.S. Pat. No. 3,341,340 and Canadian patent 854,271. In accordance with the teachings of these patents, high molecular weight polymeric materials or alkali metal salts of aminotrimethyl phosphonic acid are used to stabilize clay slurries.

In its broadest aspects, the present invention is based on the remarkable discovery that the viscosity of clay slurries can be controlled and maintained at a substantially uniform level over extended periods of time by the addition of the pentasodium salt of diethylenetriamine pentacetic acid. As to be discussed in more detail hereinafter, the diethylenetriamine pentacetic acid salt (DTPA-Na$_5$) is added to the slurry in relatively small quantities, i.e., up to about 5.0 pounds/ton clay and unexpectedly does not affect the properties or characteristics of the clay pigment or product.

It is accordingly a general object of the present invention to provide a novel method for controlling the viscosity of clay slurries shipped or stored over extended periods of time and to prevent gelling of the slurry.

A further and more particular object is to provide a method for controlling the viscosity of an aqueous slurry of finely divided kaolin clay particulates.

Yet a further object is to provide a method for controlling the viscosity of aqueous slurries of refined kaolin clay pigments in a manner such that the characteristics or properties of the refined clay is not affected or changed.

Still another object is to provide a method for forming an aqueous kaolin clay slurry which has a high clay solids content and a uniform viscosity to the extent that said viscosity does not significantly increase even when the slurry is stored or shipped for extended periods of time.

The manner in which the foregoing and other objects are achieved in accordance with the present invention will be better understood in view of the following detailed description which discloses particularly advantageous method and composition embodiments.

DESCRIPTION OF PREFERRED EMBODIMENT(S)

As briefly noted hereinabove, the present invention relates to a unique method for controlling the viscosity of clay slurries and embodies the concept and discovery that the addition of diethylenetriamine pentacetic acid pentasodium salt (DTPA-Na$_5$), serves to control the viscosity of the clay slurry in a manner such that it remains at a substantially uniform and low level even when the slurry is shipped or stored over extended periods of time. In this regard and before turning to specific details, in accordance with the invention it has been discovered that when shipping the clay slurry (comprising finely divided refined clay pigments) to the customer, the viscosity of the clay slurry increases, often times in such a manner that after several days a thick mass or gell is formed. Obviously the gelled mass cannot be easily pumped or removed from the tank car. Thus, the customer may have to employ, e.g., extensive mechanical means to redisperse the slurry and possibly various chemicals in order that the clay can be moved from the tank car. More often than not, the tank car is returned to the manufacturer as being unacceptable. This increase in the viscosity and the formation of a gell has been found to occur even though a peptizing or dispersing aid has been added to the clay slurry prior to its shipment or storage. This dispersing agent would be in addition to that, e.g., employed in the aforementioned U.S. Pat. No. 3,371,988, wherein the peptizing agent is employed in the refining of the clay itself.

While the theory of the invention is not understood, it has also been found that the aforesaid increase in viscosity is often more pronounced in hot weather, i.e., the viscosity appears to increase when the ambient temperature is high or when the tank car is heated, etc. In any event, the present invention is based on the unexpected discovery that the addition of the diethylenetriamine pentacetic acid salt (DTPA-Na$_5$) to the slurry, prior to its shipment or storage, serves to control the viscosity of the clay slurry or slip even when same is stored or shipped in tank cars over extended periods of time, i.e., from 7 to 35 days, and in hot weather.

In practicing the method of the invention, the refined clay, after filtering, is dispersed, combined with dry clay to prepare a high solids slurry and then transferred to a storage vessel or directly to the tank car for shipment. At the time of dispersion, a peptizing agent is normally added to the slurry so as to reduce its viscosity to a minimum level.

The method of the invention is especially applicable to the treatment of clay slurries containing from about 60% to about 72% clay solids (weight basis) although lesser benefits may also be realized with clay slurries as dilute as about 50% solids or as concentrated as about 75% solids. In general, economics dictate that the slurry must have a relatively high clay solids content. As defined herein, a high clay solids content is one which comprises from about 60 to 72% clay solids by weight. It is in this range wherein the significant increases in viscosity occur, particularly from the standpoint of the formation of a gelled mass. With kaolin clays, a 72% clay solids slip is about the maximum obtainable even when the most effective clay dispersing agents are used. Thus the specific clay used may limit the maximum concentration of the slurry.

In this regard, in experiments conducted in leading up to the method of the invention, it was found that the diethylenetriamine pentacetic acid pentasodium salt would, to some degree, serve to control the viscosity of slurries containing various inorganic pigments such as hydrated silica, alumina, synthetic precipitated sodium alumino silicate, etc. However, the results of such tests were limited and such as not to be considered practical from the commercial standpoint. In other words, over extended periods of time the viscosity would rise to an unacceptable level. On the other hand, truly remarkable and unexpected results were obtained when treating clay slurries with the pentasodium salt of diethylenetriamine pentacetic acid.

Further, superior results were obtained when treating slurries comprising an aqueous dispersion of finely divided refined kaolin clay. The latter, as known in the art, is a naturally occurring clay mineral consisting predominately of the clay mineral kaolinite, a crystalline hydrated aluminum silicate of the formula $Al_2O_3 \cdot 2SiO_2 \cdot 2H_2O$. The invention is especially useful with commercial paper coating grades of kaolin clay which have been chemically bleached and which have been refined to the extent that grit and undispersible agglomerates have been eliminated. Specific examples of the latter are those manufactured and sold under the trademarks "Hydragloss;" "Hydrafine;" and "Hydrasperse" by the J. M. Huber Corporation.

At this point it should be noted that the treatment of high solids content slurries comprising an aqueous mixture of the aforesaid refined, papergrade, kaolin clays is not merely a preferred embodiment of the invention. In fact, the problem solved by the present invention, i.e., controlling the viscosity and preventing gelling, is particularly acute when shipping or storing high solids content refined kaolin clay slurries. The fact that superior results are obtained when treating the latter in accordance with the invention is thus remarkable.

Turning to further specific details of the invention, the diethylenetriamine pentacetic acid salt (DTPA-$Na_5$) may be added to the slurry in an amount up to about 5.0 pounds per ton of the clay, based on the dry weight of the clay. The use of less than 0.1 pounds is generally not effective, whereas an amount greater than 5.0 pounds per ton clay does not serve to more effectively control the viscosity and also may adversely affect the properties of the clay pigment. Thus the pentasodium salt of DTPA should be added to the slurry in an amount in the range of from 0.1 to 5.0 pounds per ton clay, based on the dry weight of the clay. Particular advantageous results are obtained if the salt is added in an amount in the range of from about 0.5 to 3 pounds per ton clay. Thus the latter is preferred. The diethylenetriamine pentacetic acid pentasodium salt is normally added to the slurry as a solution thereof.

As briefly noted above, in refining clays, the crude ore from the mines is generally crushed or blunged and then slurried with water in order to produce a clay slip or slurry. These slurries are then normally classified to the desired clay fraction by such well-knon methods as gravity sedimentation, hydroseparation, and centrifugal forces. Prior to this classification, the clay slurries are usually treated with a peptizing or dispersing agent in order to achieve a dispersion of the clay particles to facilitate fractionation. Thereafter the clay slurries are subjected to further refining or processing steps, e.g., leaching, etc., to obtain a clay having a specific brightness, etc. The clay is then recovered by filtration, washed, dispersed, dried, and/or reslurried for shipment.

Prior to the present invention is an attempt to prevent gelling; a peptizing agent was added to the slurry in an amount sufficient to obtain minimum viscosity. In addition, prior to forming the slurry for shipment, the filter cake was frequently reslurried, filtered and/or washed a second time. The disadvantages of the latter, i.e., double filtration and/or washing, are obvious and require considerable time and expense resulting in an increase of the overall cost of the product. A further remarkable aspect of the invention lies in the fact that the double filtration and washing steps, and their inherent disadvantages, may be eliminated.

The following Examples will serve to further illustrate the present invention, but it should be expressly understood that they are not intended to limit it thereto.

EXAMPLE 1

In this example, a high solid content (70%) slurry of Hydragloss, an East Georgia coating clay having a particle size of 92–95% by weight of particles finer than 2 microns, was prepared from a dispersed filter cake and a spray dried clay. The specific viscosity control agent was added in the desired amount and the Brookfield viscosity determined. The slurries were aged at 130°F and a Brookfield viscosity redetermined at varying periods of time. The results of these tests are shown in Table 1.

TABLE 1

| Clay | Additive | Additive, lbs./ton | Brookfield Viscosity, cps. at 70% Solids-Aged at 130°F | | |
|---|---|---|---|---|---|
| | | | Initial | 7 Days Aging | 14 Days Aging |
| Single-Filtered | None | — | 214 | 905 | 4400 |

TABLE 1-continued

| Clay | Additive | Additive, lbs./ton | Brookfield Viscosity, cps. at 70% Solids-Aged at 130°F | | |
|---|---|---|---|---|---|
| | | | Initial | 7 Days Aging | 14 Days Aging |
| Hydragloss | Diethylene-Triamine Pentacetic Acid Pentasodium Salt | 0.5 | 223 | 582 | 1430 |
| | DTPA-Na$_5$ | 1.0 | 231 | 452 | 710 |
| | DTPA-Na$_5$ | 2.0 | 251 | 600 | 670 |
| | DTPA-Na$_5$ | 3.0 | 278 | 583 | 605 |

EXAMPLE 2

The general procedure of Example 1 was repeated except that the amount of the diethylenetriamine pentacetic acid pentasodium salt added to the slurry was varied in amounts up to 5.0 pounds per ton clay. It was found that particularly advantageous results were obtained when the salt was added in amounts in the range from 0.5 to 3.0 pounds per ton clay. In further tests, the slurries of Example 1 were aged up to a period of 35 days. In summary, the viscosity increased with the extended aging. However, the salt served to effectively control the viscosity of the slurry even when aged to this extent, i.e., 35 days. These tests further established the critical nature of the range of from 0.5 to 3.0 pounds per ton clay. Thus after 35 days the viscosity of the slurry with the addition of 2.0 to 3.0 pounds diethylenetriamine pentacetic acid pentasodium salt was less than 1200 cps whereas in the control this increased to the extent that a gelled mass was formed. Amounts up to 5.0 pounds salt prevented gelling for aging periods up to 35 days.

EXAMPLE 3

The procedure of Examples 1 and 2 were repeated except that the following kaolin clays were substituted for the Hydragloss: Hydrafine, a paper coating clay having a particle size of 92% by weight of particles finer than 2 microns and a trace coarser than 5 microns; Hydrasperse, a paper coating fraction having a particle size of 80–82% by weight finer than 2 microns and 3 to 6 percent by weight coarser than 5 microns, and CWF, a filler fraction having a particle size of 30–40 percent by weight finer than two microns and 26–44% coarser than five microns. Hydrafine, Hydrasperse, and CWF clays are Georgia kaolin clays mined and processed by the J. M. Huber Corporation at Huber, Georgia. The results of these tests were substantially the same as those of Examples 1 and 2 and clearly established that the addition of the viscosity control agent, i.e., the diethylenetriamine pentacetic acid pentasodium salt served to control the viscosity of the slurry and prevented gelling even when the slurry was aged for periods up to 35 days.

EXAMPLE 4

In a series of tests the effect of the addition of the diethylenetriamine pentacetic acid pentasodium salt on the properties of the kaolin clay pigments (Hydragloss, etc.) of Examples 1 and 3 was evaluated when said pigments were employed in paper coating mixtures. Coating mixtures containing 4 parts protein and 12 parts latex (per 100 parts clay) were prepared at concentrations of 62–64%. Coat weights of 8.0lb. /ream were applied to the felt side of a 51lb./ream Mead basestock using a Keegan Trailing Blade Coater. The coated sheets were then supercalendered and evaluated for optical and printing characteristics. The results of these tests established that the addition of the diethylenetriamine pentacetic acid sodium salt had little or no effect on the coated properties of the kaolin clay pigment as compared to a control where no viscosity control agent was added. The coating properties compared included G.E. brightness, %; 75° gloss; opacity; printed gloss; whiteness factor; and IGT, No. 4 ink, cm./sec. These figures were substantially the same whether or not DTPA salt was added.

From the above, it will be seen that the present invention provides a truly unique and simplified process for controlling the viscosity of high solids clay slurries even when the latter are shipped or stored over extended periods of time. In the unique method embodiments set forth above, it is disclosed that the salt is added to the high solids slurry prior to its shipment or storage. In this regard it has been found in the practice of the invention that this addition (i.e., of the salt) should be before the high solids slurry has reached minimum dispersion, or viscosity by the addition of the dispersing or peptizing agent. If the diethylenetriamine pentacetic acid pentasodium salt is added after minimum dispersion, the initial viscosity of the slurry increases. Thereafter the viscosity, upon aging, is controlled in the manner as taught herein. The initial viscosity increase, however, is objectionable and should be avoided. It should further be noted that the salt can be added to the low solids slurry or dispersion in which the clay itself is processed or refined, i.e., during leaching, flocculation, etc. This is indeed remarkable. In tests or experiments in which the diethylenetriamine pentacetic acid pentasodium salt was added at various stages of the processing of the clay, it was found that the viscosity of high solids slurries (formed after filtering, etc., as set forth above) was effectively controlled for extended periods of time, e.g., up to 35 days.

What is claimed is:

1. A method for controlling and maintaining the viscosity of aqueous slurries of finely divided daolin pigments, comprising the steps of refining kaolin clay particulates in an aqueous medium to reduce partical size and improve brightness and contacting the refined kaolin clay particulates in said aqueous medium, having a clay solids content in the range of from about 60 to 72% by weight, with the pentasodium salt of diethylenetriamine pentacetic acid in an amount in the range of from about 0.1 to 5.0 pounds acid per ton of said clay particulates, based on the dry weight of said clay particulates.

2. A method for controlling and maintaining the viscosity of an aqueous slurry of finely divided refined particulate kaolin clay pigments at a substantially uniform and low level during shipment and storage, said method consisting essentially of forming an aqueous slurry of finely divided refined particulate kaolin clay pigments having a clay solids content in the range of from about 60 to 72% by weight and then contacting said clay slurry with the pentasodium salt of diethylenetriamine pentacetic acid in an amount in the range of from about 0.1 to 5.0 pounds acid per ton of said clay pigments, based on the dry weight of said clay pigments.

3. The method in accordance with claim 2 wherein said diethylentriamine pentacetic salt is added to said slurry in an amount in the range of from about 0.5 to 3 pounds acid per ton of said clay pigments, based on the dry weight of said clay pigments.

4. The method of claim 2 wherein said clay pigments comprising finely divided, refined kaolin clay pigments having a particle size distribution such that 80% by weight is finer than 2 micron diameter particles, equivalent spherical diameter.

5. An aqueous slurry comprising from about 60 to 72% by weight of finely divided, refined kaolin clay pigments and, as a viscosity control agent, from about 0.1 to 5.0 pounds of the pentasodium salt of diethylenetriamine pentacetic acid per ton of said kaolin clay pigments, based on the dry weight of said pigments.

\* \* \* \* \*